US008493015B2

(12) United States Patent
Hoermann

(10) Patent No.: US 8,493,015 B2
(45) Date of Patent: Jul. 23, 2013

(54) DOOR DRIVE

(75) Inventor: Michael Hoermann, Halle/Westfalen (DE)

(73) Assignee: Marantec Antriebs-Und Steuerungstechnik GmbH & Co. KG, Marienfeld (DE)

( * ) Notice: Subject to any disclaimer, the term of this patent is extended or adjusted under 35 U.S.C. 154(b) by 1051 days.

(21) Appl. No.: 12/288,130

(22) Filed: Oct. 16, 2008

(65) Prior Publication Data

US 2009/0140675 A1 Jun. 4, 2009

(30) Foreign Application Priority Data

Oct. 17, 2007 (DE) .................... 20 2007 014 555 U

(51) Int. Cl.
*H02P 1/04* (2006.01)

(52) U.S. Cl.
USPC .......... 318/466; 318/139; 318/284; 318/286; 318/468; 320/128; 320/129; 320/130; 320/132

(58) Field of Classification Search
USPC ................ 318/280, 282, 284, 286, 466, 467, 318/468, 400.01, 281, 283, 139, 491; 320/104, 320/128, 129, 130, 132, 135
See application file for complete search history.

(56) References Cited

U.S. PATENT DOCUMENTS

| | | | | |
|---|---|---|---|---|
| 6,184,641 | B1 * | 2/2001 | Crimmins et al. | 318/466 |
| 6,597,138 | B2 * | 7/2003 | Fitzgibbon | 318/434 |
| 6,670,725 | B2 * | 12/2003 | Fitzgibbon et al. | 307/66 |
| 6,920,718 | B2 * | 7/2005 | Hom et al. | 49/49 |
| 7,073,291 | B2 * | 7/2006 | Kawanobe et al. | 49/26 |
| 7,208,897 | B2 * | 4/2007 | Hotto et al. | 318/466 |
| 7,266,962 | B2 * | 9/2007 | Montuoro et al. | 62/236 |
| 7,373,756 | B2 * | 5/2008 | Okulov et al. | 49/346 |
| 7,382,063 | B2 * | 6/2008 | Mullet et al. | 307/64 |
| 7,755,223 | B2 * | 7/2010 | Fitzgibbon | 307/326 |
| 7,786,619 | B2 * | 8/2010 | Crusius et al. | 307/66 |
| 2004/0227410 | A1 * | 11/2004 | Fitzgibbon | 307/326 |

FOREIGN PATENT DOCUMENTS

| | | |
|---|---|---|
| DE | 19641592 | 4/1998 |
| DE | 102005054693 | 6/2007 |
| WO | 03/072478 | 9/2003 |
| WO | 2004/019299 | 3/2004 |

* cited by examiner

*Primary Examiner* — Antony M Paul
(74) *Attorney, Agent, or Firm* — Dilworth & Barrese, LLP.

(57) ABSTRACT

The present invention relates to a door drive comprising electrically operated components which are supplied with electrical energy via a mains connection. In accordance with the invention, a control and an electrical energy store are provided, with the control separating the door drive from the mains and the electrical energy store providing the electrical energy in a first operating mode and with the control connecting the door drive to the mains in a second operating mode.

16 Claims, 3 Drawing Sheets

DOOR DRIVE

BACKGROUND OF THE INVENTION

The present invention relates to a door drive comprising electrically operated components which are supplied with electrical energy via a mains connection. The door drive as a rule has an electronic control as well as an electric drive motor which require electrical energy for their operation.

The drive and its control are permanently connected to the mains in known drives so that power is constantly consumed. In particular when a transformer is used to supply both the electric motor and the control with electrical energy, said transformer is, however, configured for power consumption during the operating times of the electric motor. If the electric motor is not operated, energy is thus frequently wasted.

The active operating times of door drives, i.e. the operating times of the electric motor of the drive, almost always only amount to a few minutes, however, with an opening cycle frequently also only requiring twenty seconds. During the other inactive operating times, in contrast, electrical energy is only needed for the control, while the substantially greater energy consumption for the drive motor is omitted.

Two transformers are frequently used to reduce energy losses during the inactive operating phases, one for the inactive mode and a second which can be engaged for the active operating mode. A special transformer having two windings for the respective operating modes can also be used as a special form as described in EP 6 256 26.

Such solutions are, however, complex and/or expensive in construction and can nevertheless not lower the energy consumption to a satisfactory level during the inactive operating phases.

SUMMARY OF THE INVENTION

It is therefore the object of the present invention to provide a door drive with reduced power consumption, in particular during the inactive operating times. This should advantageously be solved in a simple and cost-effective manner.

This object is solved in accordance with the invention by a door drive in accordance with the description herein. Such a door drive with electrically operated components which are supplied with electrical energy via a mains connection has, in accordance with the invention, a control and an electrical energy store, with the control separating the door drive from the mains in a first operating mode and providing the electrical energy to the electrical energy store and with the control connecting the door drive to the mains in a second operating mode. In accordance with the invention, the power consumption of the door drive can again be substantially reduced, with measurements documenting a reduction to one tenth of the usually required annual consumption of energy with respect to conventional solutions with two transformers.

In this respect, there is namely the possibility due to the integrated energy store of separating the drive completely from the mains at times. No energy from the mains is required during this time since it is provided by the energy store. The integrated energy store can be configured ideally to the inactive mode in this respect, and indeed with a very much improved efficiency compared with a power supply unit.

Further advantageously, in this respect, the door drive is operated in the first operating mode in phases in which the drive motor is not moved. The first operating mode thus corresponds to the inactive operating mode of the door drive in which only the control has to be supplied with energy, but not the drive motor, since the door is not moved. The much smaller energy consumption in this phase can now be provided without problem by the electrical energy store without the door drive having to be connected to the mains.

Further advantageously, the control switches into the second operating mode if the drive motor is moved. The substantially greater energy consumption of the drive motor can thus be provided by the mains connection.

Further advantageously, the electrical energy store is charged in the second operating mode. The energy store can thus be charged during the operating cycles of the drive motor during which the door drive is anyway connected to the mains.

Further advantageously, the door drive additionally has a charge control which switches into the second operating mode to charge the electrical energy store independently of the operating state of the drive motor. The energy store can hereby be recharged at short notice if the active operating phases of the door drive are not sufficient for the charging of the energy store. The charge control then switches into the second operating mode in which the door drive is connected to the mains and charges the energy store.

The charge control advantageously switches into the second operating mode in dependence on the charge state of the electrical energy store. The charge control therefore includes a monitoring of the charge state of the energy store and recharges it if the charge state has fallen below a specific value. The charging of the electrical energy store thus takes place as a function of the charge state.

Alternatively, the charge control can also switch into the second operating mode in dependence on the period of time which has passed since the last charge cycle. Since the maximum energy requirements in inactive operation is known (worst case), the minimum duration without recharging the energy store can be determined. If no switch into the second operating mode is anyway made during this time because the drive motor is moved, the charge control switches into the second operating mode after this period of time has passed to recharge the energy store independently of the operating state of the drive motor. The charging of the electrical energy store thus takes place as a function of the charge state.

Further advantageously, the door drive in accordance with the invention has a power supply unit which is connected to the mains connection or is separated from the mains connection to switch from one operating mode into the other operating mode. Particularly for those door drives in which the electrically operated components are supplied with electrical energy via a power supply unit, the control in accordance with the invention produces a particularly large energy saving since the power supply unit can be configured to the inactive operating phases with a much worse efficiency than the control in accordance with the invention with the electrical energy store.

Further advantageously, the control in accordance with the invention is used in a door drive which has an electrical drive motor which is supplied with electrical energy from the power supply unit. The power supply unit has to provide a very large amount of electrical energy during the active operating phases in which the drive motor is moved in such drives and only very little in inactive operating phases in which the drive motor is not moved. The control in accordance with the invention comprising the electrical energy store can effect a huge reduction in the energy consumption here with respect to the prior art.

BRIEF DESCRIPTION OF THE DRAWINGS

The present invention will now be shown in more detail with reference to embodiments and to drawings.

There are shown

DESCRIPTION OF THE PREFERRED EMBODIMENTS

Figure 1:
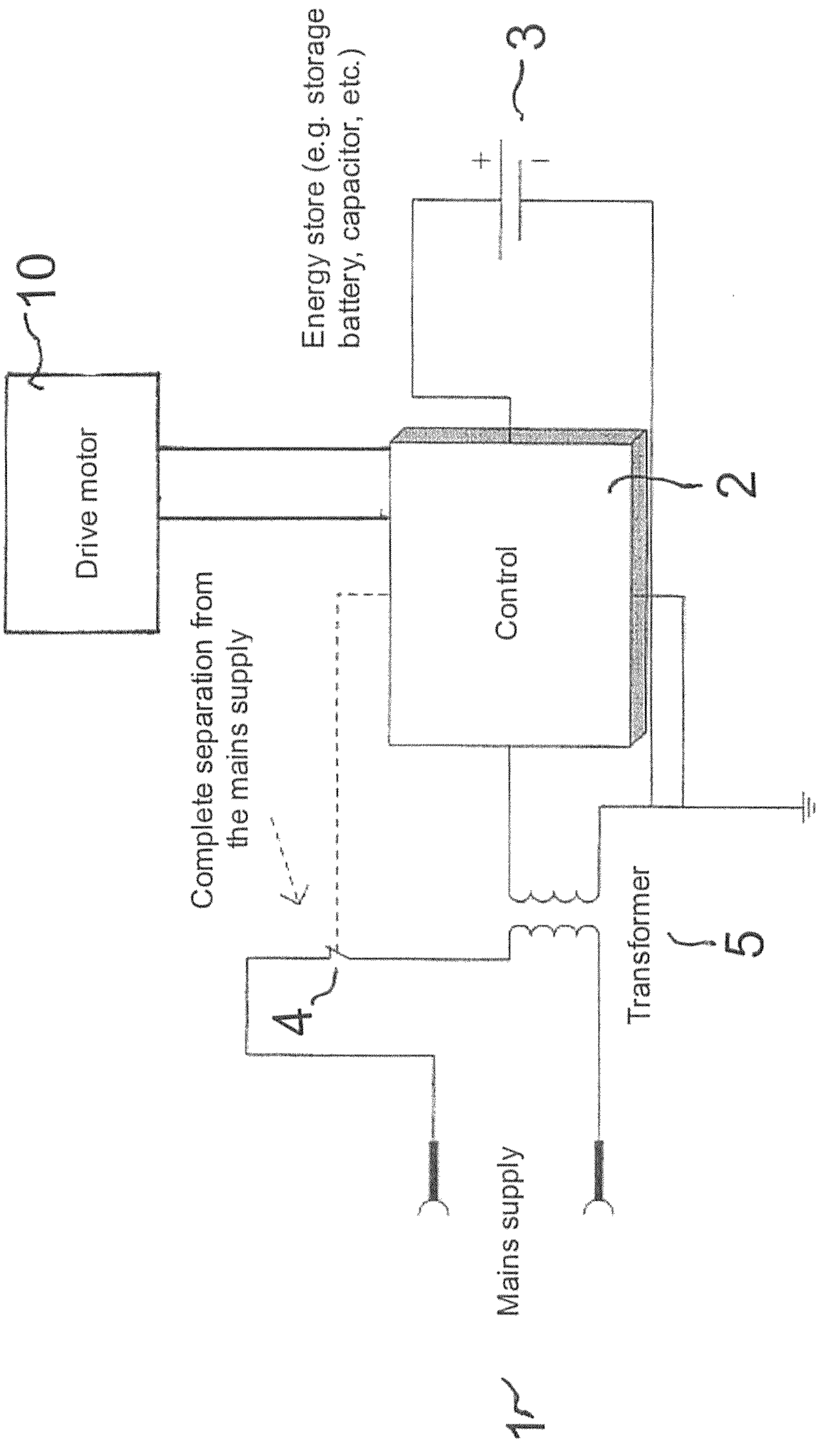
FIG. 1 a schematic diagram of an embodiment of the door drive in accordance with the invention.

FIG. 1 shows an embodiment of the door drive in accordance with the invention in which a control 2 and a drive motor 10 have to be supplied with electrical energy. For this purpose, the door drive can be connected to a mains supply 1 which provides electrical energy.

In this respect, a transformer 5 is provided which can be connected to the mains supply 1 or separated from the mains supply 1 via a switch 4. The transformer 5 provides the electrical energy with which the control 2 and the drive motor 10 are operated. For this reason, the transformer is configured for power consumption during the active operating phases of the door drive during which the drive motor 10 moves the door.

An energy store 3 is provided to supply electrical energy during inactive operating phases during which the drive motor 10 is not moved and thus the power consumption of the total system is considerably smaller than the power consumption for which the transformer 5 is configured. The control 2 now separates the transformer 5 from the mains in inactive phases by controlling the switch 4 so that the total door drive is completely separated from the mains supply. The electrical energy for the control is provided via the energy store 3 during this first operating mode. A storage battery or a capacitor can e.g. be used as the energy store.

The control 2 can now switch from this first operating mode into a second operating mode in that it closes the switch 4 and thus connects the transformer 5 to the mains supply 1. The control 2 in particular switches into this second operating mode when the drive motor 10 should be moved in order to provide the then considerably higher power consumption via the mains supply 1.

The energy store 3 is, in contrast, configured for the inactive operation during which the drive motor 10 is not moved so that only the control 2 has to be supplied with energy. The electrical energy is thus provided by the energy store, which is hereby discharged, during the first operating mode. If, in contrast, the control switches into the second operating mode because the door should be moved by the drive motor 10, the energy store 3 is simultaneously charged via the electrical energy provided by the mains supply 1.

The control 2 in accordance with the invention furthermore has a charge control which switches into the second operating mode to charge the electrical energy store independently of the operating mode of the drive motor 10. It is hereby ensured that the energy store is also charged when the drive motor 10 is not moved over long operating times.

Figure 2:
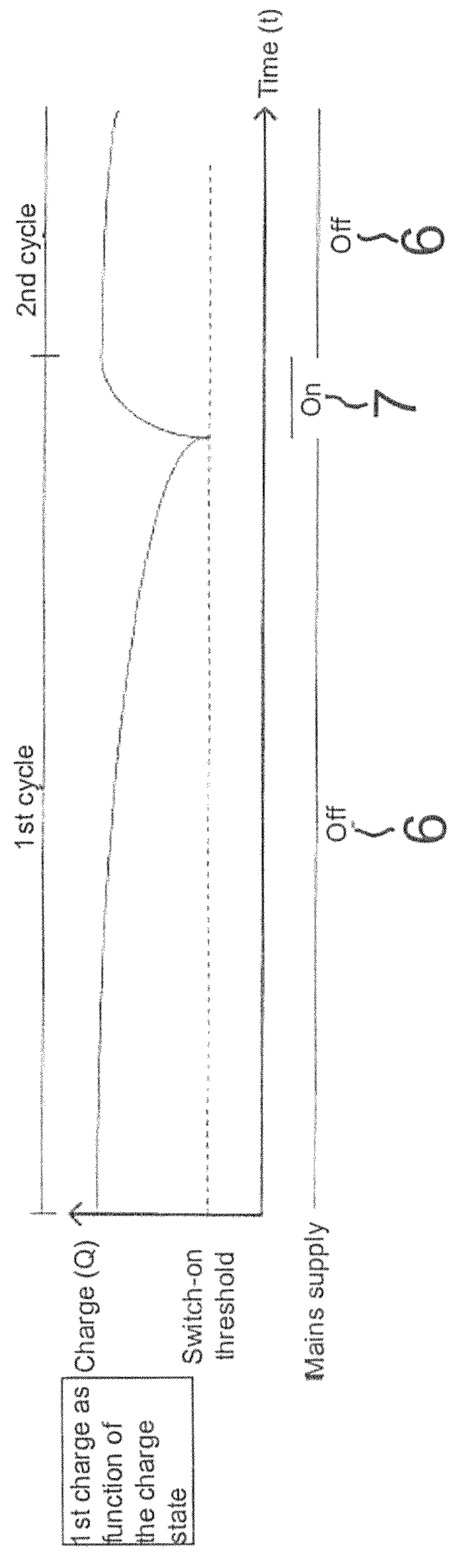
FIG. 2 a first embodiment of a charge control in accordance with the invention.
Figure 3:
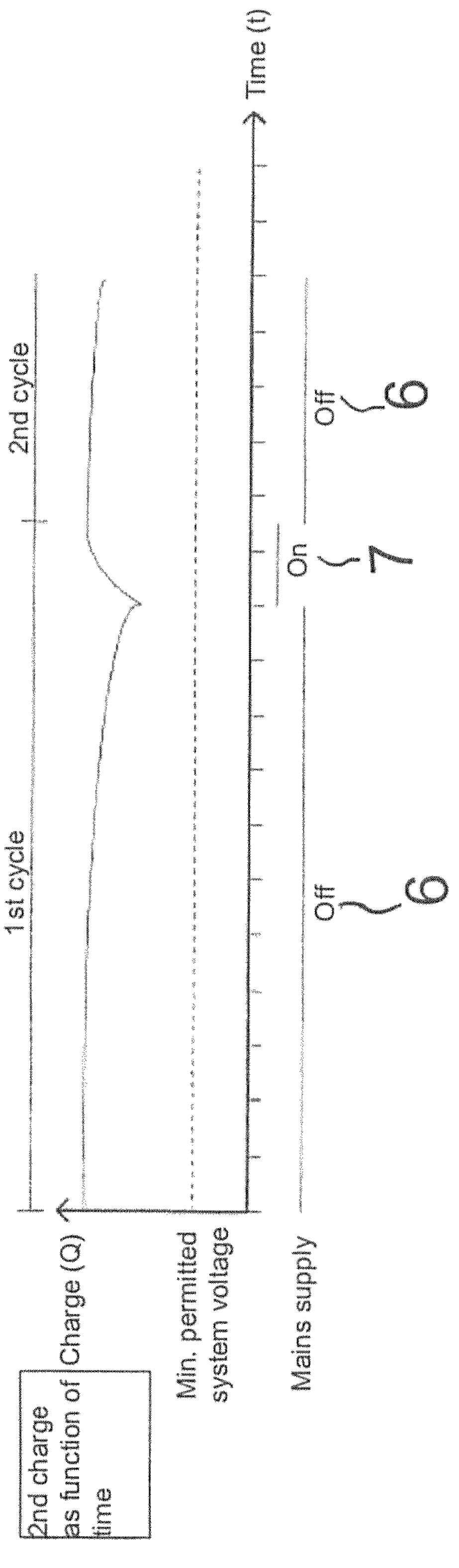
FIG. 3 a second embodiment of a charge control in accordance with the invention.

In FIGS. 2 and 3, a first embodiment and a second embodiment of such a charge control are shown in which the charge takes place as a function of the charge state or of time. In this respect, the graph shows the charge state of the electrical energy store 3 which can e.g. be determined with reference to the voltage supplied by the energy store in dependence on time. It is additionally indicated below the diagram whether the door drive is connected to the mains supply or not, i.e. whether the door drive is in the first operating mode 6 in which the drive is separated from the mains supply and the electrical energy is provided by the electrical energy store or in the second operating mode 7 during which the door drive is connected to the mains supply 1.

In the embodiment of the charge control shown in FIG. 2, the charging takes place as a function of the charge state. If the charge of the energy store falls below a switch-on threshold, the charge control automatically switches from the first operating mode 6 into the second operating mode 7 in that it connects the door drive in accordance with the invention to the mains. The electrical energy is hereby charged via the mains supply 1. If the electrical energy store is charged, the charge control again switches back into the first operating mode and separates the door drive in accordance with the invention from the mains supply so that the electrical energy is again provided by the electrical energy store which is hereby again discharged. Typical charge cycles thus consist of a long operating time in the first operating mode 6 which is followed by a short operating time in the second operating mode 7. If the control switches into the second operating mode independently of the actual charge control because the drive motor 10 should be moved, the energy store is likewise charged so that a new cycle hereby starts.

FIG. 3 now shows an alternative embodiment of the charge control in accordance with the invention in which the charging takes place as a function of time. Since the maximum energy requirements in the inactive mode are known, the minimum duration without recharging the energy store can be determined. If the second operating mode in which the energy store is recharged is not anyway activated during this time due to an operation of the drive motor 10, the charge control switches into the second operating mode for recharging. It can also hereby be ensured that the system voltage provided by the energy store does not fall below a minimum permitted system voltage.

In this connection, the power consumption of the door drive in accordance with the invention can be reduced, considered over the period of a year, to approximately one tenth of the usually required amount of energy by the complete separation of the door drive in accordance with the invention from the mains during a large part of the operating time. A substantial energy saving and improved environmental protection hereby result.

The integrated energy store of the present invention can in this respect be ideally configured to the inactive mode in its efficiency, which is a great deal more efficient during the inactive operating times than the energy supply by a power supply unit. The energy store is then charged during the active operating cycles during which the drive motor 10 is moved and the door drive in accordance with the invention is anyway connected to the mains supply. If this is not sufficient, since the door drive is not activated often enough, the charge control in accordance with the invention intervenes which recharges the electrical energy store via the mains supply if required.

The invention claimed is:

1. A door drive comprising electrically operated components (2, 10) which are supplied with electrical energy via a mains connection (1), a control (2), an electric drive motor (10), an electrical energy store (3), wherein the control (2) separates the door drive from the mains connection (1) and the electrical energy store (3) provides The electrical energy in a first operating mode (6) where the drive motor (10) is not moved, and the control connects the door drive to the mains connection (1) and the mains connection (1) provides the electrical energy in a second operating mode (7) where the drive motor (10) is moved, further comprising a charge control which switches into the second operating mode (7) to charge the electrical energy store (3) independently of the operating mode of the drive motor (10), wherein the charge control switches into the second operating mode (7) in dependence on the period of time which has passed since the last charge cycle.

2. A door drive in accordance with claim 1, wherein the electrical energy store (3) is charged in the second operating mode (7).

3. A door drive in accordance with claim 2, comprising a charge control which switches into the second operating mode (7) to charge the electrical energy store (3) independently of the operating mode of the drive motor (10).

4. A door drive in accordance with claim 3, comprising a power supply unit (5) which is connected to the mains connection (1) or is separated from the mains connection (1) to switch from one operating mode into the other operating mode.

5. A door drive in accordance with claim 1, wherein the charge control switches into the second operating mode (7) in dependence on the charge state of the electrical energy store (3).

6. A door drive in accordance with claim 1, comprising a power supply unit (5) which is connected to the mains connection (1) or is separated from the mains connection (1) to switch from one operating mode into the other operating mode.

7. A door drive in accordance with claim 6, comprising an electrical drive motor (10) which is supplied with electrical energy by the power supply unit (5).

8. A door drive in accordance with claim 1 , wherein the electrical energy store (3) is charged in the second operating mode (7).

9. A door drive in accordance with claim 8, comprising a charge control which switches into the second operating mode (7) to charge the electrical energy store (3) independently of the operating mode of the drive motor (10).

10. A door drive in accordance with claim 9, comprising a power supply unit (5) which is connected to the mains connection (1) or is separated from the mains connection (1) to switch from one operating mode into the other operating mode.

11. A door drive in accordance with claim 1, wherein the electrical energy store (3) is charged in the second operating mode (7).

12. A door drive in accordance with claim 11, comprising a charge control which switches into the second operating mode (7) to charge the electrical energy store (3) independently of the operating mode of the drive motor (10).

13. A door drive in accordance with claim 1, comprising a charge control which switches into the second operating mode (7) to charge the electrical energy store (3) independently of the operating mode of the drive motor (10).

14. A door drive in accordance with claim 13, comprising a power supply unit (5) which is connected to the mains connection (1) or is separated from the mains connection (1) to switch from one operating mode into the other operating mode.

15. A door drive in accordance with claim 1, comprising a charge control which switches into the second operating mode (7)to charge the electrical energy store (3) independently of the operating mode of the drive motor (10).

16. A door drive in accordance with claim 15, comprising a power supply unit (5) which is connected to the mains connection (1) or is separated from the mains connection (1) to switch from one operating mode into the other operating mode.

* * * * *